United States Patent
Malloy et al.

(10) Patent No.: US 7,600,539 B2
(45) Date of Patent: Oct. 13, 2009

(54) LOW PROFILE TEXTILE WIRE BUNDLER SLEEVE

(75) Inventors: Cassie M. Malloy, Blue Bell, PA (US); Ming-Ming Chen, West Chester, PA (US); Gerald T. Lien, Exton, PA (US)

(73) Assignee: Federal-Mogul World Wide, Inc, Southfield, MI (US)

( * ) Notice: Subject to any disclaimer, the term of this patent is extended or adjusted under 35 U.S.C. 154(b) by 131 days.

(21) Appl. No.: 11/712,650

(22) Filed: Mar. 1, 2007

(65) Prior Publication Data

US 2007/0210490 A1 Sep. 13, 2007

Related U.S. Application Data

(60) Provisional application No. 60/779,289, filed on Mar. 3, 2006, provisional application No. 60/827,556, filed on Sep. 29, 2006.

(51) Int. Cl.
*D03D 3/08* (2006.01)
*D03D 11/02* (2006.01)
*D03D 15/04* (2006.01)
*D03D 3/00* (2006.01)

(52) U.S. Cl. .............................. 139/387 R; 139/420 R; 139/420 A; 139/384 A

(58) Field of Classification Search ............. 139/384 R, 139/387 R, 420 R, 426 R, 420 A
See application file for complete search history.

(56) References Cited

U.S. PATENT DOCUMENTS

| | | | | |
|---|---|---|---|---|
| 3,439,865 A | * | 4/1969 | Port et al. ................... | 383/117 |
| 3,476,870 A | * | 11/1969 | Ross ............................ | 174/69 |
| 3,495,025 A | | 2/1970 | Ross | |
| 3,503,106 A | * | 3/1970 | Port et al. ................... | 264/103 |
| 4,281,211 A | * | 7/1981 | Tatum et al. ................. | 174/36 |
| 4,572,922 A | | 2/1986 | Plummer, III | |
| 4,600,454 A | | 7/1986 | Plummer | |
| 4,808,771 A | | 2/1989 | Orr, Jr. | |
| 4,822,304 A | | 4/1989 | Herron | |
| 4,946,722 A | | 8/1990 | Moyer | |
| 5,178,923 A | | 1/1993 | Andrieu et al. | |
| 5,373,103 A | | 12/1994 | Orr, Jr. et al. | |
| 5,387,113 A | | 2/1995 | Dickerson et al. | |
| 5,413,149 A | | 5/1995 | Ford et al. | |
| 5,532,429 A | | 7/1996 | Dickerson et al. | |
| 5,843,542 A | * | 12/1998 | Brushafer et al. .......... | 428/36.1 |
| 6,045,884 A | | 4/2000 | Hess et al. | |
| 6,233,796 B1 | * | 5/2001 | van Wassenhove et al. .... | 28/100 |

(Continued)

*Primary Examiner*—Bobby H Muromoto, Jr.
(74) *Attorney, Agent, or Firm*—Robert L. Stearns; Dickinson Wright, PLLC

(57) ABSTRACT

A low profile fold protective textile sleeve for bundling elongate members has longitudinally and laterally interlaced monofilament warp and fill yarns. Flat profile monofilaments are employed in the warp direction and round monofilaments in the fill direction. The flat monofilaments are considerably wider than they are thick, and provide the sleeve with flexibility and bending out of the plane of the sleeve. The round monofilaments may be sized so that their diameter is about the same as the thickness of the flat monofilaments, and they can be bundled together so that the effective width of each bundle approximates the width of the flat monofilament yarns with which they are intertwined. The round monofilaments are heat-set along at least a portion of their length to provide biased living hinge regions of the sleeve, while also lending strength and stiffness to the sleeve along the fill direction.

24 Claims, 5 Drawing Sheets

U.S. PATENT DOCUMENTS

| | | |
|---|---|---|
| 6,276,121 B1 | 8/2001 | Nabeshima et al. |
| 6,328,080 B1 | 12/2001 | Winters |
| 6,340,510 B2 | 1/2002 | Hess et al. |
| 6,476,323 B2 | 11/2002 | Beebe et al. |
| 6,822,166 B2 | 11/2004 | James et al. |
| 6,978,643 B2 * | 12/2005 | Akers et al. .................... 66/170 |
| 7,013,929 B2 * | 3/2006 | Laurent et al. .............. 138/123 |
| 7,188,642 B2 * | 3/2007 | James et al. ............ 139/384 R |
| 2004/0081411 A1 | 4/2004 | Gladfelter et al. |
| 2004/0084203 A1 * | 5/2004 | Gladfelter et al. ............. 174/93 |
| 2005/0185902 A1 * | 8/2005 | James et al. ................ 385/100 |

* cited by examiner

LOW PROFILE TEXTILE WIRE BUNDLER SLEEVE

CROSS-REFERENCE TO RELATED APPLICATIONS

This application claims the benefit of U.S. Provisional Application Ser. No. 60/779,289, filed Mar. 3, 2006, and U.S. Provisional Application Ser. No. 60/827,556, filed Sep. 29, 2006, which are both incorporated herein by reference in their entirety.

BACKGROUND OF THE INVENTION

1. Technical Field

This invention relates generally to sleeves for covering bundles of wires and more particularly to low profile textile sleeves.

2. Related Art

Electrical wires are often bundled together in a round bundle and protected by a tubular sleeve. Sometimes the round bundle causes difficulties in that the package size is too bulky. For example, when wires are to be routed under carpeting in a vehicle or flush along a surface, the round profile presents a problem and often requires alternative routing options to be considered.

Some sleeve products offer a flatter profile which enables the wires to be bundled flat, but often these types of sleeves are generally rigid (e.g., molded plastics material) and are not easily routed when bends and turns in the path are necessary. When using these products, alternative routing options may need to be considered.

A sleeve according to the present invention overcomes or greatly minimizes the foregoing limitations of the prior art described above.

SUMMARY OF THE INVENTION

According to one presently preferred aspect of the invention, a low profile fold protective textile sleeve for use in flat bundling of a plurality of wires comprises longitudinally and laterally interlaced monofilament warp and fill yarns that are heat-set to a generally flat fold configuration. In one presently preferred embodiment, flat profile monofilaments are employed in the warp direction and round monofilaments in the fill direction, also referred to synonymously as the weft direction. The flat monofilaments provide the sleeve with flexibility and bending out of the plane of the sleeve to assist in routing the bundle of wires around corners and along contoured surfaces. The flat monofilaments also provide the sleeve with a low profile, as the yarns are considerably wider than they are thick. The round monofilaments may be sized so that their diameter is about the same as the thickness of the flat monofilaments. Accordingly, the round monofilaments can be grouped or bundled together so that the effective width of each bundle approximates the width of the flat monofilament yarns with which they are intertwined. The round monofilaments are heat-set along at least a portion of their length to provide biased living hinge regions of the sleeve, while also lending strength and stiffness to the sleeve along the fill direction.

One presently preferred sleeve configuration includes a base section and at least two folding sections extending from laterally opposite sides of the base section. The folding sections are joined to the base section by respective living hinge regions adjacent the opposite sides, enabling the folding sections to fold inwardly toward one another into overlying relation to one another and to the base section. As mentioned, the hinge regions are formed by a heat-set region of the bundles of fill yarns. The interlaced warp and fill yarns provide a generally open structure to the sleeve to permit the passage of moisture.

According to another aspect of the invention, the hinge regions of the sleeve can be reinforced by interlacing stiffening yarns therein. The stiffening yarns are different than those of the warp and fill yarns, and can be provided as multifilament yarn. The stiffening yarns provide a generally closed structure in the hinge regions as opposed to the generally open structure of the base and folding sections. Accordingly, the reinforced hinge regions provide structural integrity and body to the to overall construction of the sleeve, and particularly to the hinge regions to facilitate biasing the two folding sections toward the folded positions overlying the base section.

As such, the sleeve is useful for taking a bundle of wires and maintaining them in a low profile generally flat bundle configuration for routing the wires in areas where there are space constraints or where a generally flat bundle is preferred. The choice of materials and sizes of materials for the warp and fill monofilaments and the interlacing of the stiffening yarns at the hinge regions presents a sleeve that is itself generally low in profile, yet able to apply sufficient closing force on a wire bundle to urge and support the bundle in a flat configuration.

The combination of the monofilament fill and warp yarns yields a sleeve that has an open structure of interstices so that moisture is free to escape through the sleeve. The stiffening yarns may be provided as multifilament yarn that can be intertwined or woven to stiffen the hinge regions and to make them generally solid reinforced living hinges. The folding portions may be dimensioned such that when in the folded condition, the free ends of the folding portions overlap one another. In one embodiment, one of the folding portions is wider than the other, wherein the shorter folding portion serves as a relatively rigid flap beneath which the free end of the wider folding portion is tucked to facilitate retention of the sleeve in the closed condition once arranged about the wire bundle or bundles.

The flat fold construction may be one which results in either a true fold flat sleeve where the folding portions rest on or slightly spaced from the base section, or may be somewhat box-shaped where the folding portions are spaced sufficiently from the base section when in the folded condition to accommodate a larger bundle of wires. This latter box shaped construction is well suited for flat bundling a bunch or a plurality of bunches of round electrical wires while maintaining rigidity along the length of the sleeve such that it does not sag or bow along its length under the weight of the wires. Accordingly, in accordance with another aspect of the invention, the degree of box shape of the sleeve can be controlled by the intertwined stiffening yarns, with a wider course of the yarns yielding a wider effective hinge region forming essentially closed sides of the box structure.

In accordance with yet another aspect of the invention, the degree of box shape can be controlled while heat setting the weft monofilaments in the hinge region. Rather than forming a single hinge at the opposite sides of the sleeve, a pair of hinges can be heat set on each side of the sleeve, thereby providing the sleeve with opposite sidewalls of the desired height.

In accordance with yet another aspect of the invention, the sleeves can be constructed by interlacing multifilament warp yarns with the fill monofilaments, such that the multifilaments extend along the length of the sleeve in the base portion and/or folding portions. The multifilaments act to maintain the fill monofilaments in their intended location relative to the warp monofilaments. As such, the warp multifilaments can be laterally spaced and uniformly distributed about the circumference of the sleeve to maintain uniform interstices or openings between the interlaced warp and fill monofilaments.

The choice of materials for the yarns may be of a number of materials and combinations of materials may be employed, including those that are fire rated. The choice of materials may be governed in part by the conditions in which the sleeve will operate, and considerations such as temperature rating, flammability, wear resistance, noise, EMI may be taken into account when selecting the material.

BRIEF DESCRIPTION OF THE DRAWINGS

These and other aspects, features and advantages of the invention will become readily appreciated when considered in connection with the following detailed description of presently preferred embodiments and best mode, appended claims and accompanying drawings, in which:

DETAILED DESCRIPTION OF PRESENTLY PREFERRED EMBODIMENTS

Figure 1:
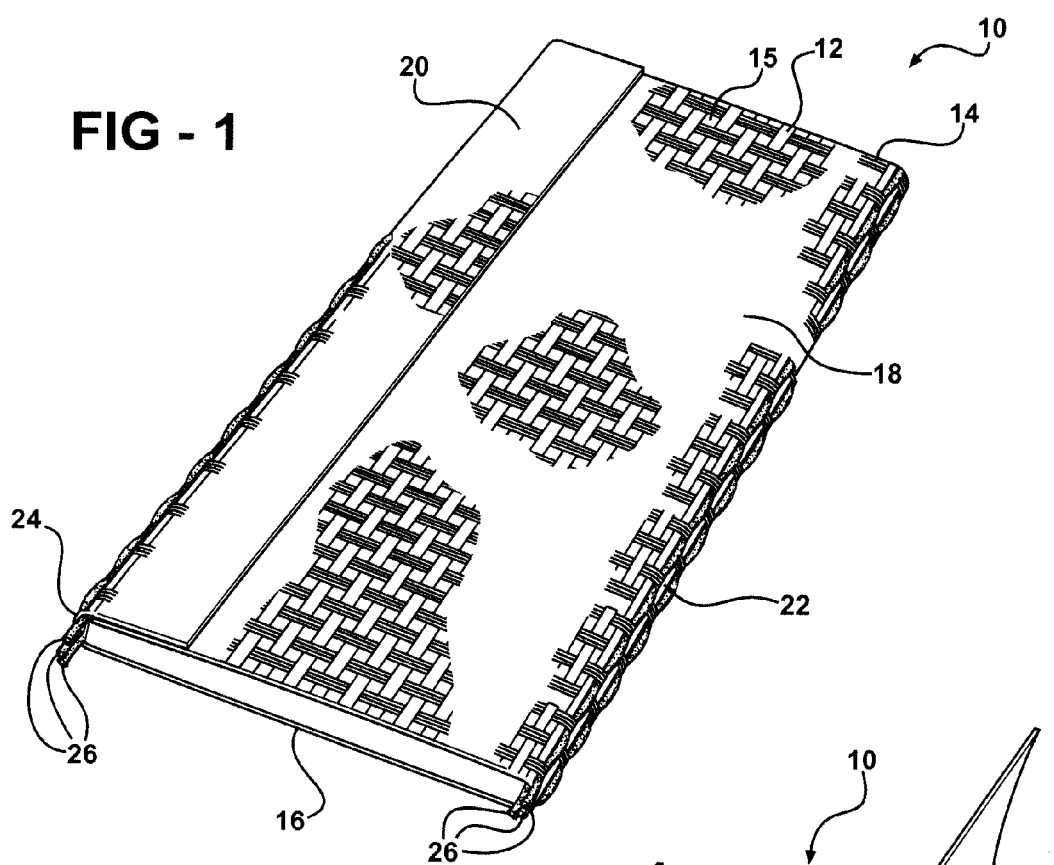
FIG. 1 is a perspective view of a sleeve constructed according to one presently preferred embodiment of the invention shown in a closed position.
Figure 2:
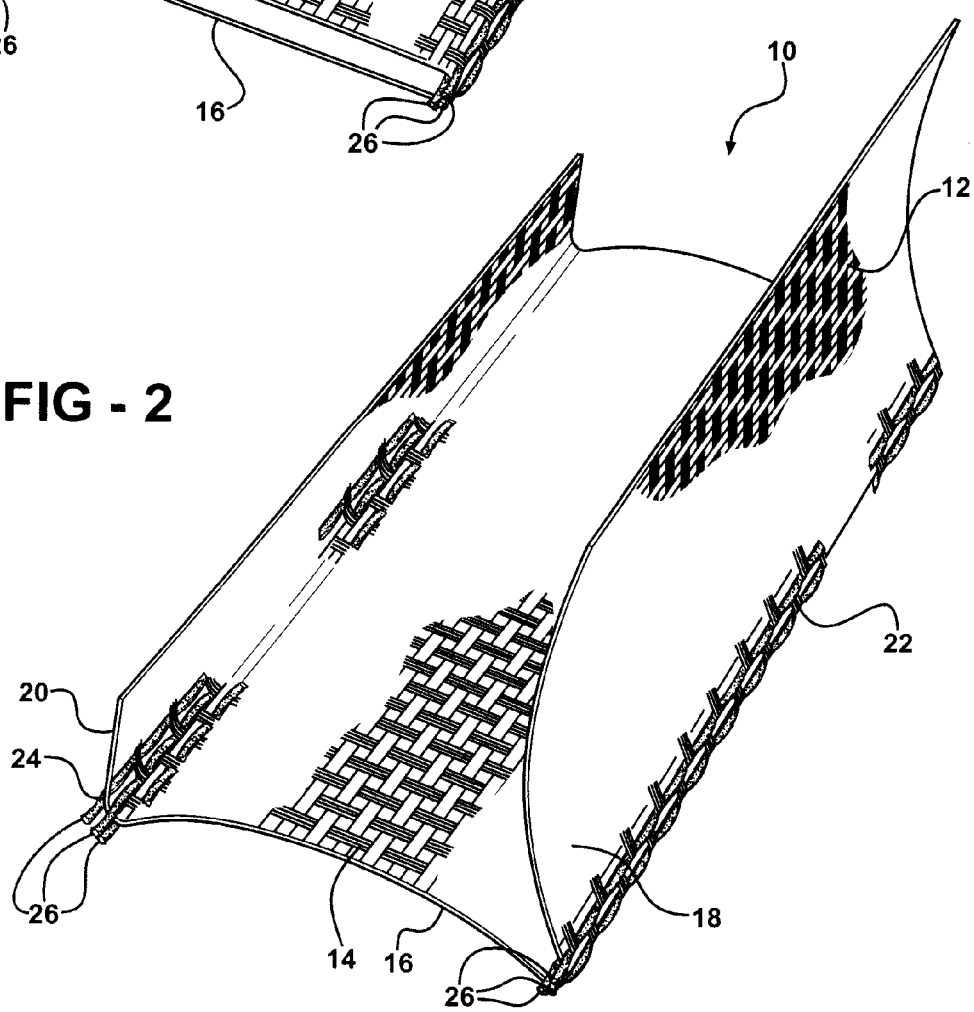
FIG. 2 is a perspective view of the sleeve of FIG. 1 shown in an open position.

Referring in more detail to the drawings, FIGS. 1-2 show a low profile protective textile sleeve for use in bundling a plurality of wires generally at 10. The sleeve 10 includes a plurality of longitudinally extending monofilament warp yarns 12 and a plurality of latitudinally extending weft or fill monofilament yarns 14. The yarns 12, 14 are intertwined with one another and heat-set to form a generally flat fold configuration of the sleeve 10. The intertwined yarns 12, 14 yield an open structure of the sleeve 10. The yarns 12, 14 may be intertwined through weaving, such as on a narrow fabric needle loom or broadloom, for example, or warp knitting (for example, Raschel or Crochet). The openings or interstices are identified at 15 in the drawings and provide open spaces through which moisture can pass so as to minimize any buildup of moisture against the wire bundle in the sleeve 10, while also lending to a reduced weight sleeve structure.

The sleeve 10 includes a base portion or section 16 and at least two folding portions or sections 18, 20. The folding sections 18, 20 extend from opposite lateral sides of the base section 16 and are joined to the base section 16 by living hinge regions 22, 24 adjacent the lateral sides. The living hinge regions 22, 24 enable the folding sections 18, 20 to fold inwardly toward one another into overlying relation to the base section 16 to yield the generally flat fold condition of the sleeve 10, while also allowing the folding sections 18, 20 to be biased under an applied force outwardly for insertion or removal of the wire bundle.

Figure 4:
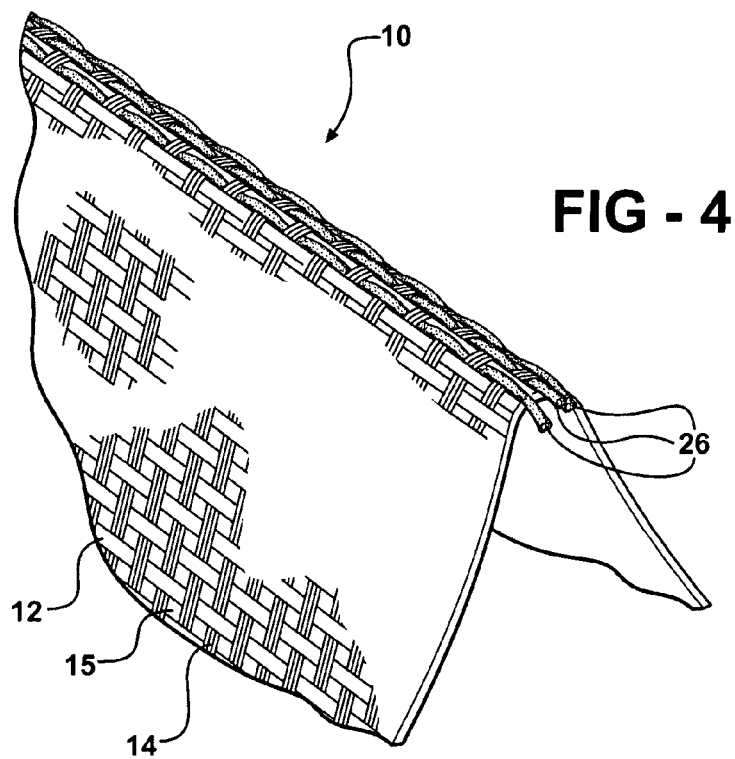
FIG. 4 is an enlarged fragmentary perspective view of the sleeve of FIG. 1 illustrating details of the hinge region.

The hinge regions 22, 24 are formed by heat-set regions of the fill yarns 14 and, when in the relaxed state, the hinge regions 22, 24 urge the sleeve 10 toward the folded condition. Opening the sleeve 10 by spreading the folding sections 18, 20 back is met with resistance of the heat-set hinge regions 22, 24 which counteract to force the sleeve 10 closed when the force is removed. The hinge regions 22, 24, such as best shown in FIG. 4, may be reinforced with stiffening yarns 26 which are intertwined tightly in the warp direction with the fill yarns 14 in the region of the hinges 22, 24. The stiffening yarns 26 add structural integrity to the hinge regions and assist the heat-set yarns 14 in exerting a strong closing force on the folding sections 18, 20 to flatten and support the wire bundle within the sleeve 10.

The folding sections 18, 20 may be of different width, with the section 18, by way of example and without limitations, being wider than that of the section 20. As best shown in FIG. 1, the free end of the wider section 18 may be tucked under the free edge of the shorter, and thus stiffer, section 20 to help retain the folding sections 18, 20 in the closed condition when in use. The stiffening yarns 26 are preferably multifilament and may be woven in a 2/2 pointed broken twill pattern, for example. The monofilaments 12, 14 may be woven in a plain weave pattern with a dual fill insertion of the fill yarns 14, also by way of example and without limitation.

The types and sizes of materials for the warp 12 and weft 14 monofilaments and the interlacing of the stiffening yarns 26 in the hinge regions 22, 24 presents the sleeve 10 with a generally low profile while providing sufficient closing force on a wire bundle to help urge and maintain the bundle in a flat configuration. The warp yarns 12 may be flat profile monofilaments. This helps keep the sleeve 10 flexible for bending out of the plane of the sleeve 10 to assist in routing the bundle of wires around corners and along contoured surfaces. The flat monofilaments 12 also lend to a low profile, as the yarns are preferably considerably wider than they are thick. The flat monofilaments 12 may have a width ranging from about 0.02 to 0.059 inches and a thickness ranging from about 0.004 to 0.059 inches, though these dimensions could be varied dependent upon the application. In the illustrated embodiment shown in FIGS. 1-4, the flat monofilaments 12 have a width of about 0.01 inches and a thickness of about 0.04 inches.

Figure 3:
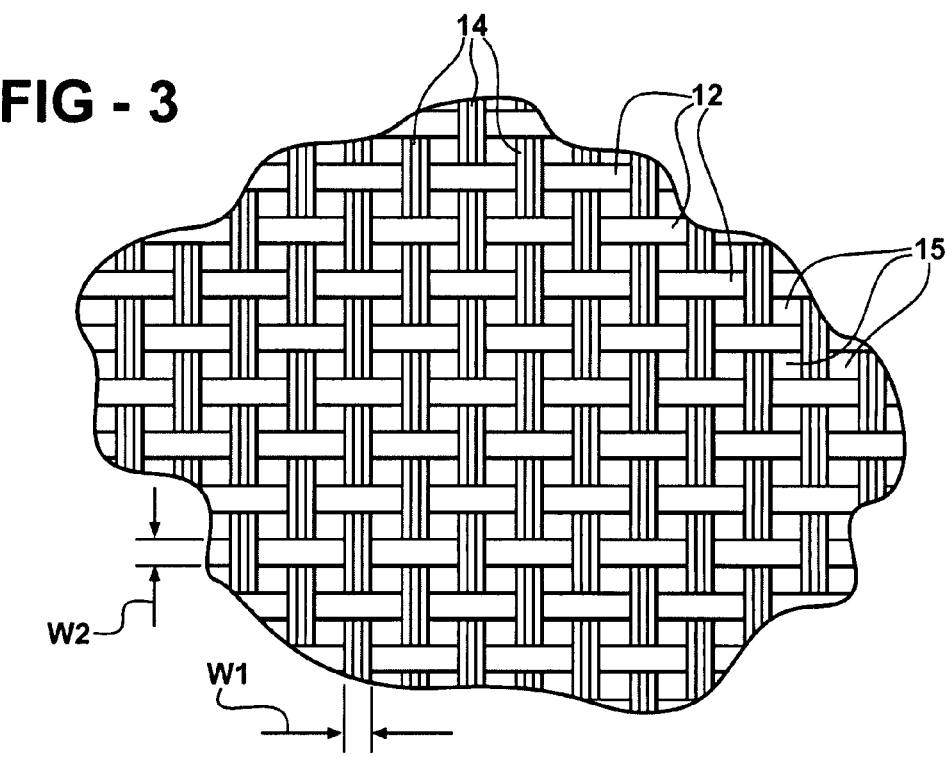
FIG. 3 is an enlarged fragmentary view of the sleeve of FIG. 1 illustrating detail of the woven yarns of the sleeve.

The yarns used for the fill 14 may be round monofilaments. As best shown in FIG. 3, these may be sized relative to the flat monofilament yarns 12 so that the diameter of the round monofilaments 14 is about the same as the thickness of the flat monofilaments 12. For example, the round monofilaments 14 may have a diameter ranging from about 0.006 to 0.050 inches, and in the illustrated embodiment, the round filaments 14 have a diameter of about 0.01. The round monofilaments 14 may be grouped together (via dual insertion) so that the effective width W1 of a group or bundle of the round filament yarns 14 approximates the width W2 of the flat monofilament yarns 12 with which they are intertwined. In the illustrate example, the round monofilaments 14 are presented in groups of three, which approximates the width W2 of the flat monofilaments 12, and yields the open structure of the sleeve 10. While the flat nature of the monofilaments 12 provides the sleeve 10 with flexibility for bending and routing out of its plane in installation, the round monofilaments 14 are better able to be heat-set to add strength and integrity to the living hinge regions 22, 24 so that the sleeve 10 applies a strong closing force on the wire bundle when place in the sleeve 10 to urge and maintain the wires in a flat bundled configuration. The heat-set round monofilaments 14 further cooperate with the stiffening yarns 26 to enhance the closing force on the folding portions 18, 20.

The flat or low profile fold construction may be one which results in either a true fold flat sleeve where the folding sections 18, 20 rest on the base section 16, or may be somewhat box-shaped where the folding sections are spaced from the base section when in the folded condition. This latter box construction, as discussed in relation to another presently preferred embodiment hereafter, is well suited for flat bundling a bunch or bunches of round electrical wires as the open center of the sleeve forms, in effect, a low profile rectangular conduit or jacket in which the wires can be accommodated. The degree of box-shape can be controlled by the intertwined stiffening yarns 26, with a wider course of the yarns yielding a wider effective hinge region forming essentially closed sides of the box structure of the sleeve 10. The degree of box-shape can also be controlled via the heat-set configuration of the weft monofilaments 14 in the hinge regions 22, 24. The sleeve 10 may be initially processed flat, and then it can be formed with the assistance of heat and pressure to the flat fold (truly flat or box-shaped 3D) profile.

The choice of materials for the monofilament and multifilament yarns 12, 14 may be selected from any of a number of materials, and combinations of materials may be employed, including those that are fire rated. The choice of materials may be governed in part by the conditions in which the sleeve 10 will operate, and considerations such as temperature rating, flammability, wear resistance, noise, EMI may be taken into account when selecting the material. Material choices for the flat and round monofilaments 12, 14 include, but are no limited to: PET, Nylon, PPS, PEEK, PP, PE, PFA, bi-component, and fire-retardant (FR) versions of PET, Nylon. The multifilament stiffening yarns 26 may be made from other materials as well, including, but not limited to: PET, Nylon, PPS, PP, PE, PTFE, Panox, Nomex, Kevlar, and other meta-Aramids, fiberglass, and silica.

Figure 5:
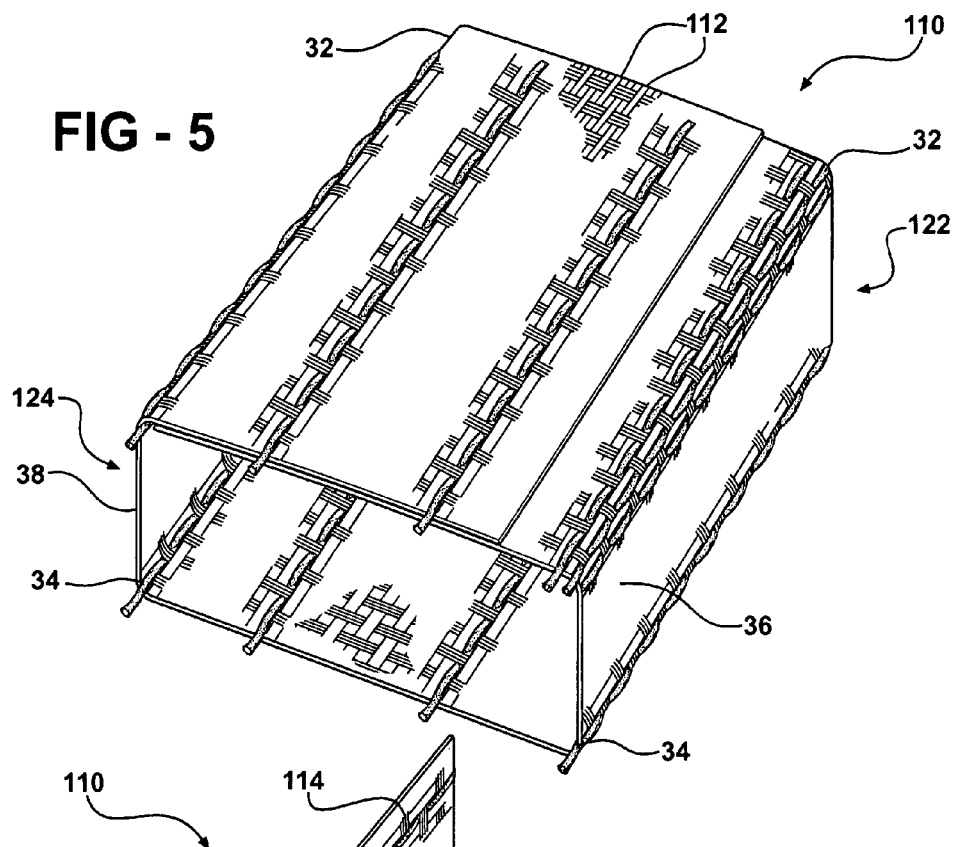
FIG. 5 is a perspective view of a sleeve constructed according to another presently preferred embodiment of the invention shown in a closed position.
Figure 6:
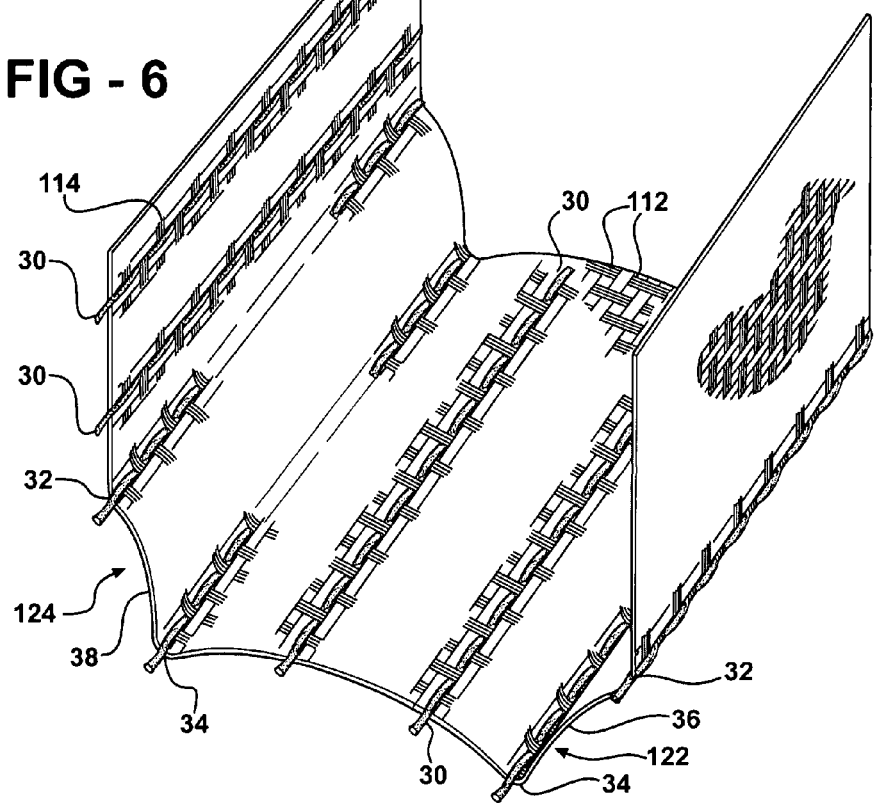
FIG. 6 is a perspective view of the sleeve of FIG. 5 shown in an open positions.
Figure 7:
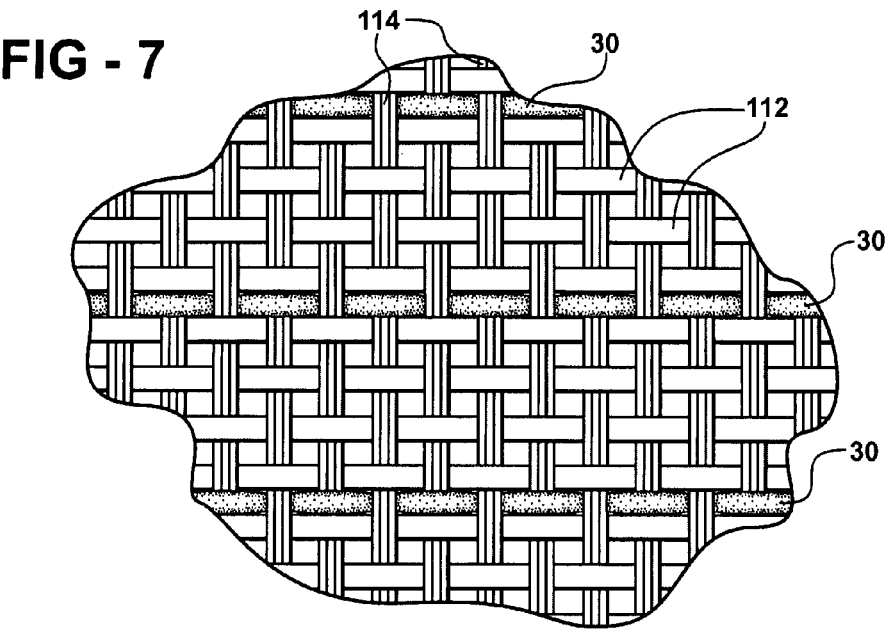
FIG. 7 is an enlarged fragmentary view illustrating details of the woven structure of the sleeve of FIG. 5.

FIGS. 5 and 6 illustrate a low profile textile sleeve constructed according to another presently preferred embodiment of the invention generally at 110. The sleeve 110 is constructed similarly as disclosed above, and thus, reference numbers offset by 100 are used to identify like features. The sleeve 110 has taller hinge regions 122, 124 than shown in the previous embodiment, thereby providing the sleeve 110 with a generally rectangular boxed-shape in lateral cross-section. Each of the hinge regions 122, 124 is formed by a pair of heat-set folds 32, 34 at opposite sides of sidewalls 36, 38 forming the box-shaped sleeve. It should be recognized that the sides 36, 38 can be formed having a height as desired for the intended application. Accordingly, the sleeve 110 has an increased height from that of the flat fold embodiment, and thus, is able to accommodate increased diameter wire bundles.

In addition to having generally flat warp monofilaments 112 as in the previous embodiment, the sleeve 110 has multifilament warp yarns 30 interlaced with and generally perpendicular to the weft monofilaments 114 along the length of the sleeve 10. The multifilament yarns 30 provide stability and a source of friction on the weft monofilaments 114, and thus, act to maintain the weft monofilaments 114 in their intended location relative to the warp monofilaments 112. Accordingly, the interlaced filaments of the sleeve 110 maintain their spacing relative to one another, thereby maintaining uniform openings or interstices between the respective yarns in use.

Figure 8:
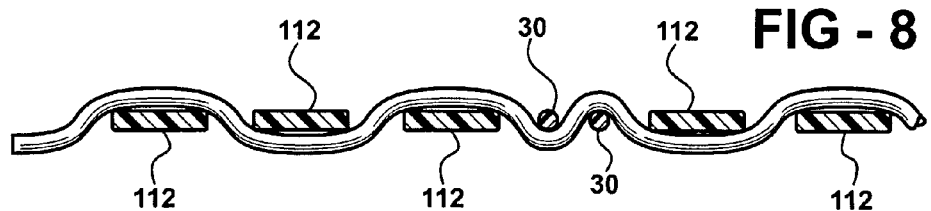
FIG. 8 is a cross-sectional view taken generally along line 8-8 of FIG. 7.

Each of the multifilament warp yarns 30 can comprise dual multifilament yarns (FIG. 8), although single multifilament yarns 30 can be used. The warp yarns 30 can be evenly spaced relative to one another across the width of the base section 116 and the folding sections 118, 120, though they could be spaced otherwise, if desired. It is preferred to space the multifilaments 30 laterally about 5 mm to 20 mm in generally parallel relation from one another, generally corresponding to about a 4-8 warp spacing, and shown here, by way of example and without limitations, as a 6 warp spacing. Accordingly, a pair of multifilament yarns 30 extending along the warp direction are present every 6 warp monofilaments 112 uniformly about the circumference of the sleeve 110.

Figure 9:
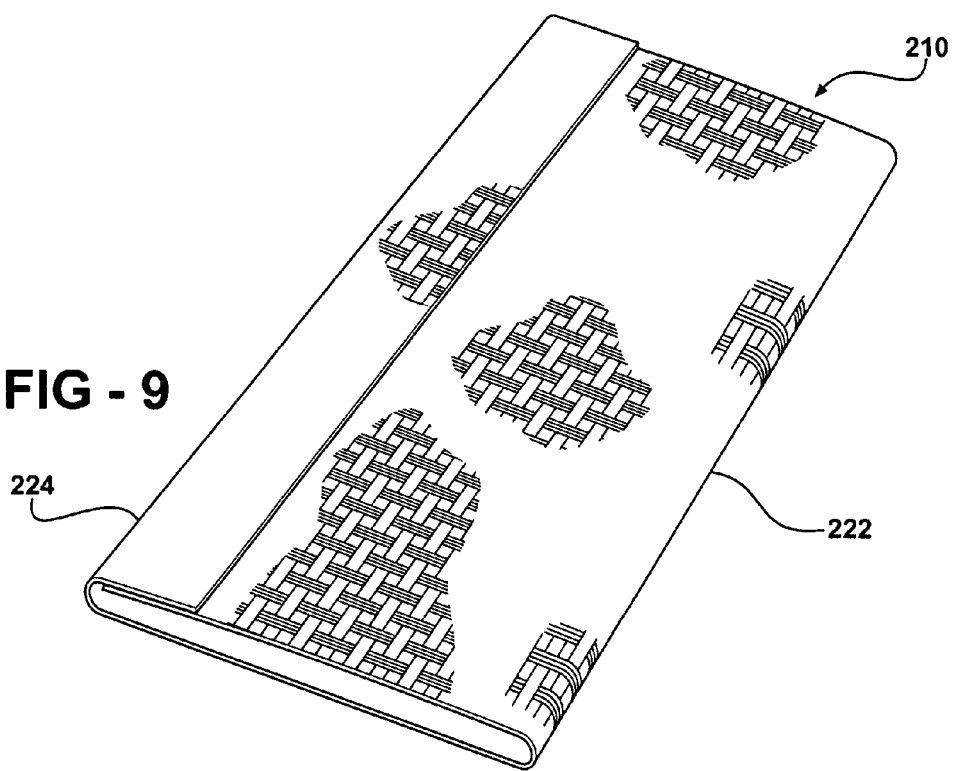
FIG. 9 is a perspective view of a sleeve constructed according to another presently preferred embodiment of the invention shown in a closed position.
Figure 10:
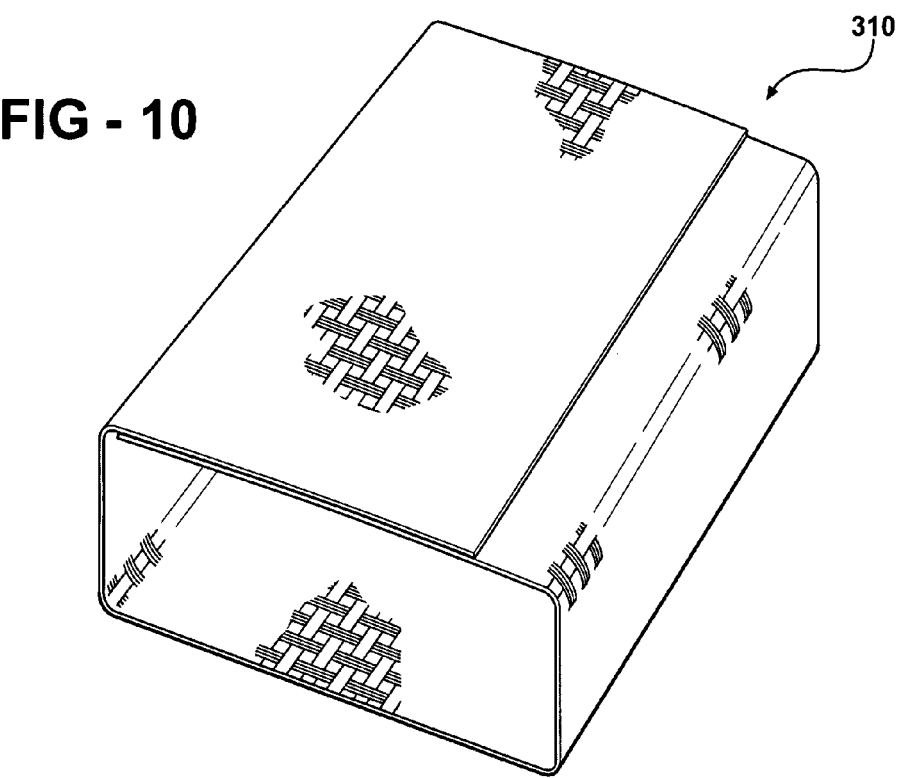
FIG. 10 is a perspective view of a sleeve constructed according to yet another presently preferred embodiment of the invention shown in a closed position.

Sleeves 210, 310 constructed in accordance with additional aspects of the invention are illustrated in FIGS. 9 and 10, respectively. The sleeve 210 is constructed similarly to the sleeve 10, however, the multifilament warp yarns 26 from the sleeve 10 are not introduced into the hinge regions 222, 224 the sleeve 210. Accordingly, other than the missing multifilament warp stiffening yarns 26, the sleeve 210 is the same as the sleeve 10. The sleeve 310 is constructed similarly to the sleeve 110, however, the multifilament warp yarns 30 from the sleeve 110 are not incorporated in the sleeve 310. Accordingly, other than the lacking the multifilament warp yarns 30, the sleeve 310 is the same as the sleeve 110.

Figure 11:
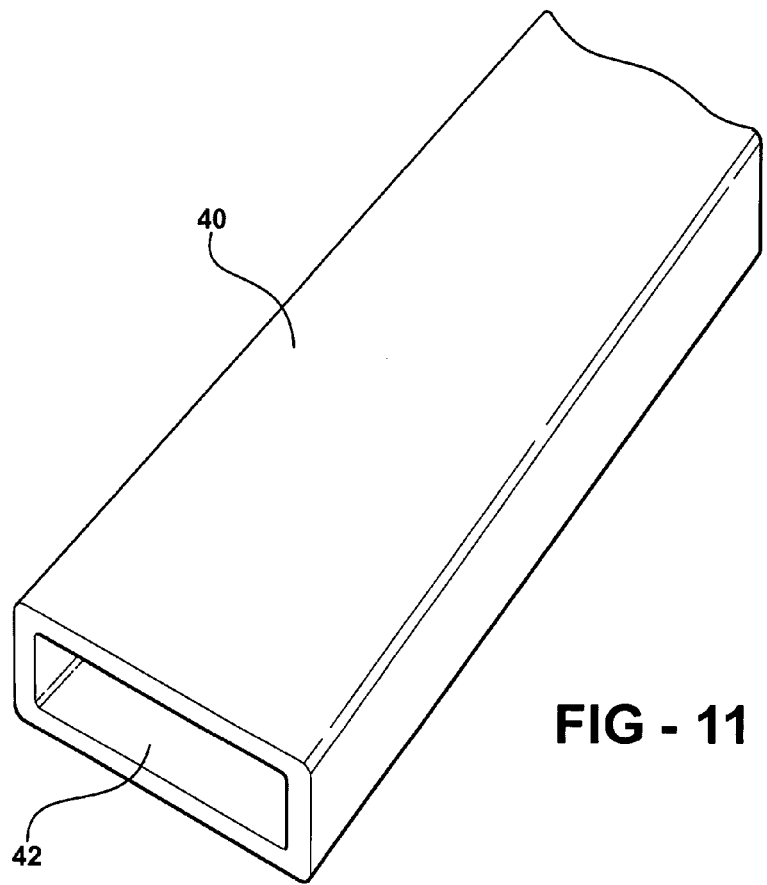
FIG. 11 is a cross-sectional view taken through a warp monofilament constructed in accordance with another aspect of the invention.

In accordance with another aspect of the invention, the warp monofilaments of the sleeves 10, 110, 210, 310 can be provided as generally square or otherwise shaped hollow round monofilaments 40 initially, and thereafter flattened (FIG. 11), such as through controlled application of heat and/or pressure. As such, the respective sleeve 10, 110, 210, 310 can be constructed, and during a heat-setting process used to form the heat-set living hinge sections, the hollow monofilaments 40 can also be heated and flattened. The hollow monofilaments 40 inherently retain air pockets 42 to provide enhanced insulation properties to the sleeves.

The sleeves 10, 110, 210, 310 constructed in accordance with the invention are not limited to the use of flat warp monofilaments 12, 112, 212, 312 and round weft monofilaments 14, 114, 214, 314. Both warp and weft yarns could be round, or both flat, but the illustrated embodiments are presently preferred.

It is to be understood that other embodiments of the invention which accomplish the same function are incorporated herein within the scope of the claims.

We claim:

1. A low profile textile sleeve, comprising:
   a substantially flat base section having lateral sides extending along a length of said sleeve;
   a pair of substantially flat folding sections;
   at least one pair of living hinge regions operably connecting said folding sections to said lateral sides of said base section; and
   wherein said base section and said folding sections comprise flat warp monofilaments and round weft monofilaments interlaced with one another to define a generally uniform distribution of interstices, at least some of said round weft monofilaments being arranged adjacently in side-by-side relation to one another as bundles of two or more monofilaments, said round weft monofilaments being heat-set to form said living hinge regions, said living hinge regions biasing said folding sections in overlying, substantially parallel relation to said base section.

2. The sleeve of claim 1 further comprising warp multifilaments interlaced in said hinge regions.

3. The sleeve of claim 1 further comprising warp multifilaments interlaced with said weft monofilaments in at least one of said base section or said folding sections.

4. The sleeve of claim 3 wherein said warp multifilaments are in each of said base section and said folding sections.

5. The sleeve of claim 4 wherein said warp multifilaments are uniformly spaced in parallel relation to one another.

6. The sleeve of claim 3 wherein said multifilaments are interlaced in bundles of at least two multifilaments.

7. The sleeve of claim 1 wherein said warp monofilaments have a width and height and said weft monofilaments have a diameter substantially the same as said height.

8. The sleeve of claim 7 wherein said bundles have a width about the same as said width of said warp monofilaments.

9. The sleeve of claim 1 further comprising another pair of hinge regions spaced from said at least one pair of hinge regions to provide laterally spaced sidewalls extending between said base section and said folding sections.

10. The sleeve of claim 9 wherein said sleeve is rectangular in lateral cross-section.

11. The sleeve of claim 1 wherein at least some of said warp monofilaments are hollow.

12. The sleeve of claim 1 wherein at least some of said warp monofilaments have a width and height and said weft monofilaments forming said bundles have a diameter about the same as said height.

13. The sleeve of claim 12 wherein said bundles have a width about the same as said width of said warp monofilaments.

14. The sleeve of claim 1 wherein said weft monofilaments are arranged to form a plurality of said bundles spaced from one another.

15. The sleeve of claim 14 wherein said plurality of said bundles are distributed in uniformly spaced relation from one another along a length of said sleeve.

16. A method of constructing a textile sleeve for protecting elongate members, comprising:

providing a plurality of flat monofilaments and a plurality of round monofilaments;

arranging at least some of said round monofilaments in side-by-side relation to one another as bundles of two or more monofilaments;

interlacing said plurality of flat monofilaments and said plurality of round monofilaments with one another with said flat monofilaments extending along a length of the sleeve in a warp direction and the round monofilaments extending along a width of the sleeve in a weft direction transverse to the flat monofilaments; and heat-setting at least a portion of said round monofilaments to form at least a pair of living hinge regions, said living hinge regions connecting a substantially flat base section to a pair of substantially flat folding sections overlying said substantially flat base section in generally parallel relation thereto.

17. The method of claim 16 further including weaving said plurality of monofilaments with one another with said bundles extending in the weft direction.

18. The method of claim 16 further including providing at least some of said monofilaments as hollow filaments extending along a length of said sleeve.

19. The method of claim 18 further including flattening said hollow filaments during said heat-setting.

20. The method of claim 16 further including interlacing multifilaments in said hinge regions.

21. The method of claim 16 further including interlacing multifilaments in at least one of said base section or said folding sections.

22. The method of claim 21 further including arranging said multifilaments in uniformly spaced relation to one another about a circumference of said sleeve.

23. The method of claim 17 further including providing at least some of said flat warp monofilaments having a width and height and providing said weft monofilaments forming said bundles as round members having a diameter about the same as said height.

24. The method of claim 23 further including forming said bundles having a width about the same as said width of said flat members.

* * * * *